(12) United States Patent
Milne

(10) Patent No.: US 11,891,914 B2
(45) Date of Patent: Feb. 6, 2024

(54) SAFETY APPARATUS

(71) Applicant: Siemens Energy Global GmbH & Co. KG, Bayern (DE)

(72) Inventor: Trevor Milne, Sheffield (GB)

(73) Assignee: Siemens Energy Global GmbH & Co. KG, Bayern (DE)

( * ) Notice: Subject to any disclaimer, the term of this patent is extended or adjusted under 35 U.S.C. 154(b) by 456 days.

(21) Appl. No.: 17/284,939

(22) PCT Filed: Aug. 12, 2019

(86) PCT No.: PCT/EP2019/071558
§ 371 (c)(1),
(2) Date: Apr. 13, 2021

(87) PCT Pub. No.: WO2020/088810
PCT Pub. Date: May 7, 2020

(65) Prior Publication Data
US 2021/0355829 A1 Nov. 18, 2021

(30) Foreign Application Priority Data
Oct. 30, 2018 (EP) .................................. 18203338

(51) Int. Cl.
*F01D 5/02* (2006.01)
*F01D 21/04* (2006.01)
(Continued)

(52) U.S. Cl.
CPC ............. *F01D 5/025* (2013.01); *F01D 21/04* (2013.01); *F02C 7/00* (2013.01); *F01D 5/026* (2013.01);
(Continued)

(58) Field of Classification Search
CPC combination set(s) only.
See application file for complete search history.

(56) References Cited

U.S. PATENT DOCUMENTS

| | | |
|---|---|---|
| 4,887,949 A | 12/1989 | Dimmick, III et al. |
| 9,302,655 B2 * | 4/2016 | Kassler .................. B60T 1/005 |

(Continued)

FOREIGN PATENT DOCUMENTS

| | | |
|---|---|---|
| CN | 104364472 A | 2/2015 |
| EP | 3168588 A1 | 5/2017 |

(Continued)

OTHER PUBLICATIONS

International search report and written opinion dated Oct. 24, 2019 for corresponding PCT/EP2019/071558.

*Primary Examiner* — Binh Q Tran
(74) *Attorney, Agent, or Firm* — Wolter Van Dyke Davis, PLLC

(57) ABSTRACT

A safety apparatus for containing a release of energy from a tension stud of a rotor assembly, the safety apparatus includes an elongate member defining a longitudinal axis and at least two arms projecting away from the longitudinal axis of the elongate member. In use, in a first orientation, the elongate member is configured to be connected to a tool apparatus for applying a load energy to the tension stud and the at least two arms of the safety apparatus are configured to overlap with at least part of the tool apparatus in the direction of the longitudinal axis of the elongate member to contain the release of energy therebetween.

15 Claims, 7 Drawing Sheets

(51) Int. Cl.
　　　*F02C 7/00*　　　　(2006.01)
　　　*F01D 19/00*　　　(2006.01)
　　　*F01D 21/00*　　　(2006.01)
　　　*F01D 21/06*　　　(2006.01)
　　　*F02C 3/107*　　　(2006.01)

(52) U.S. Cl.
　　　CPC .............. *F01D 19/00* (2013.01); *F01D 21/00* (2013.01); *F01D 21/06* (2013.01); *F02C 3/107* (2013.01); *F05D 2220/323* (2013.01); *F05D 2240/24* (2013.01); *F05D 2240/60* (2013.01); *F05D 2260/36* (2013.01)

(56) References Cited

U.S. PATENT DOCUMENTS

| | | | |
|---|---|---|---|
| 10,844,754 B2 * | 11/2020 | Weber | F01L 1/047 |
| 2011/0214963 A1 * | 9/2011 | Beylotte | F16D 41/16 |
| | | | 192/106 R |
| 2013/0125559 A1 * | 5/2013 | Shepherd | F01D 5/066 |
| | | | 60/796 |
| 2014/0318144 A1 * | 10/2014 | Lazzeri | F01D 21/20 |
| | | | 60/801 |
| 2015/0078901 A1 * | 3/2015 | Milne | F16B 31/06 |
| | | | 403/299 |
| 2016/0061146 A1 * | 3/2016 | Werquin | F16H 25/2454 |
| | | | 92/15 |
| 2016/0258491 A1 | 9/2016 | Harrison | |

FOREIGN PATENT DOCUMENTS

| | | |
|---|---|---|
| GB | 898164 A | 6/1962 |
| WO | 2014195091 A1 | 12/2014 |

\* cited by examiner

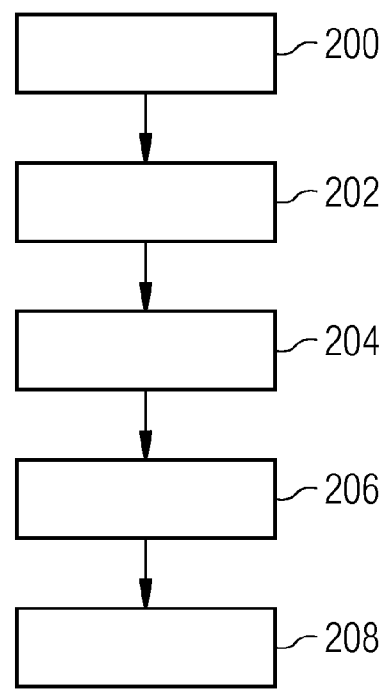

SAFETY APPARATUS

CROSS REFERENCE TO RELATED APPLICATIONS

This application is the US National Stage of International Application No. PCT/EP2019/071558 filed 12 Aug. 2019, and claims the benefit thereof. The International Application claims the benefit of European Application No. EP18203338 filed 30 Oct. 2018. All of the applications are incorporated by reference herein in their entirety.

FIELD OF INVENTION

The present disclosure relates to a safety apparatus for containing loads applied to shaft arrangements particularly, but not exclusively for turbo engines and turbo-machines having a compressor, a turbine or a power turbine mounted to an axial shaft.

BACKGROUND

In gas turbine engines, compressors and turbines typically have axially arranged sets of rotors, each comprising an array of blades mounted to rotor discs. The respective sets of rotors are located between end shafts on a tension stud that extends through all or part of the set of rotors. In operation, the rotation of the rotors causes high separation forces to develop in the rotors. To counter these separation loads, a compression load is applied to the shaft and the rotors prior to use to offset the separation loads that develop in operation. To develop the compression load in the shaft and rotors, the tension stud is stretched during assembly to develop a tension within the tension stud. The tension stud is then held in its stretched form by a load retainer that engages with the shaft. The tension stud will react against the shaft via the load retainer to apply the compression load to the shaft.

Due to the high loads required to counter the separation loads encountered in operation, the risk of injury to assembly fitters due to an energy release resulting from a failure of one or more components of the rotor assembly is high.

To overcome this problem, each component of the tooling assemblies is designed with a high factor of safety, which leads to increased size and weight of each component as well as increased expense. Further, each component is subject to regular non-destructive testing, which is time-consuming and leads to increased assembly time.

An alternative solution to overcome this problem is to utilise a robotic assembly to avoid interaction of an operator with the tool assembly during loading of the tension stud. However, this leads to significant expense.

Hence a need for improved safety when applying loads to a tension stud is highly desirable.

SUMMARY

According to the present disclosure there is provided an apparatus and method as set forth in the appended claims. Other features of the invention will be apparent from the dependent claims, and the description which follows.

According to a first aspect of the invention, there is provided a safety apparatus for containing a release of energy from a tension stud of a rotor assembly, the safety apparatus comprising an elongate member defining a longitudinal axis and at least two arms projecting away from the longitudinal axis of the elongate member. In use, in a first orientation, the elongate member is configured to be connected to a tool apparatus for applying a load energy to the tension stud and the at least two arms of the safety apparatus are configured to overlap with at least part of the tool apparatus in the direction of the longitudinal axis of the elongate member to contain the release of energy therebetween. Hence there is provided a safety apparatus suitable for containing a load applied to a tension stud of a rotor assembly in the event of a failure of one or more components and/or connections of the rotor assembly. The provision of the safety apparatus significantly reduces the risk to nearby workers and equipment as any energy released by a failure of one or more components will be restrained by the safety apparatus. Further, the provision of safety apparatus as part of the tool assembly avoids the necessity to redesign current components, which are already in operation.

In one example, the safety apparatus is movable between the first orientation and a second orientation in which the at least two arms of the safety apparatus are clear of the tool apparatus in the direction of the longitudinal axis of the elongate member. As the safety apparatus is movable, the operator may be able to move the safety apparatus such that it is in the containment position and a non-containment position to enable the user to have access to the tool apparatus and also install the tool apparatus.

In one example, the safety apparatus includes a lifting member projecting away from the longitudinal axis of the elongate member in a first direction and the at least two arms project away from the longitudinal axis of the elongate member in a second direction, wherein the second direction is different to the first direction. In use, the lifting member is movable to move the safety apparatus between the first orientation and the second orientation. The provision of the lifting member enables the tool assembly to be lifted as one piece.

In one example, the safety apparatus is rotatable throughout approximately 90 degrees between the first orientation and the second orientation.

There may be provided a tool assembly for applying a load to a tension stud of a rotor assembly. The tool assembly includes at least one safety apparatus and a tool apparatus. The tool apparatus includes a tool head for connecting to the tension stud a compression body for engaging with a shaft of the rotor assembly and an actuator for applying a load to the tool head and compression body. The at least one safety apparatus may be connected to the tool assembly and in the first orientation, at least part of the tool head is located between the at least two arms of the safety apparatus. The provision of the tool assembly including the safety apparatus enables the load to be applied to the tension stud and shaft of a rotor assembly in a safe manner.

The tool assembly may include two diametrically opposed safety apparatus connected to the tool apparatus. The provision of two diametrically opposed safety apparatus means that the energy released as a result of a failure will be shared between the two safety apparatus.

In one example, the tool head includes a removable insert. The removable insert may include a male thread for engaging with a co-operative female thread within the tool head and a female thread for engaging with a co-operative male thread of the tension stud. The removable insert may be made of a higher grade material compared with the rest of the tool head and so prolong the usable lifetime of the tool head.

In one example, the compression body includes a substantially cylindrical sidewall comprising an aperture. The provision of a substantially cylindrical sidewall comprising an aperture enables an operator to access the inside of the compression body. In one example, the operator is able to access a connector connected to a load retainer within the compression body.

In one example, the tool assembly includes a measurement apparatus configured to measure the extension of the tension stud. The measurement apparatus may be used to determine that the tension stud has extended by a pre-determined amount, equivalent to a pre-determined tension load being developed in the tension stud and hence, a pre-determined compression load being applied to the shaft.

In one example, the measurement apparatus includes a plunger configured to extend through the tool head and engage with the tension stud.

In one example, the actuator is a hydraulic load cell, which enables high loads to be accurately applied to the tension stud.

In one example the tool apparatus is moveable relative to the safety apparatus in the second orientation such that the tool head is engageable with the lifting member to enable the tool assembly to be lifted as a single piece.

According to another aspect of the invention, there is provided a method of applying a load to a tension stud of a rotor assembly. The method includes engaging a compression body with a shaft of the rotor assembly, connecting a tool head to the tension stud, providing an actuator between the tool head and the compression body, positioning the safety apparatus in a first orientation in which at least part of the tool head is located between the at least two arms of the safety apparatus and actuating the actuator to apply a load to the tool head and the compression body to provide a tension load in the tension stud. This method enables a load to be safely applied to the tension stud.

In one example, the method may include measuring the elongation of the tension stud via measurement apparatus. The measurement apparatus may be used to determine that the tension stud has extended by a pre-determined amount, equivalent to a pre-determined tension load being developed in the tension stud and hence, a pre-determined compression load being applied to the shaft.

The method may also include the steps of determining that the tension stud has elongated by a predetermined amount and rotating a connector connected to a load retainer which is co-operatively threaded to the tension stud, wherein the load retainer is moved so that it engages with the shaft of the rotor assembly.

BRIEF DESCRIPTION OF THE DRAWINGS

Examples of the present disclosure will now be described with reference to the accompanying drawings, in which:

FIG. 8 shows a flow diagram of steps of a method of applying a load to a tension stud of a rotor assembly.

The illustration in the drawings is shown schematically. It is noted that for similar or identical elements in different figures, the same reference signs will be used.

DETAILED DESCRIPTION

Figure 1:
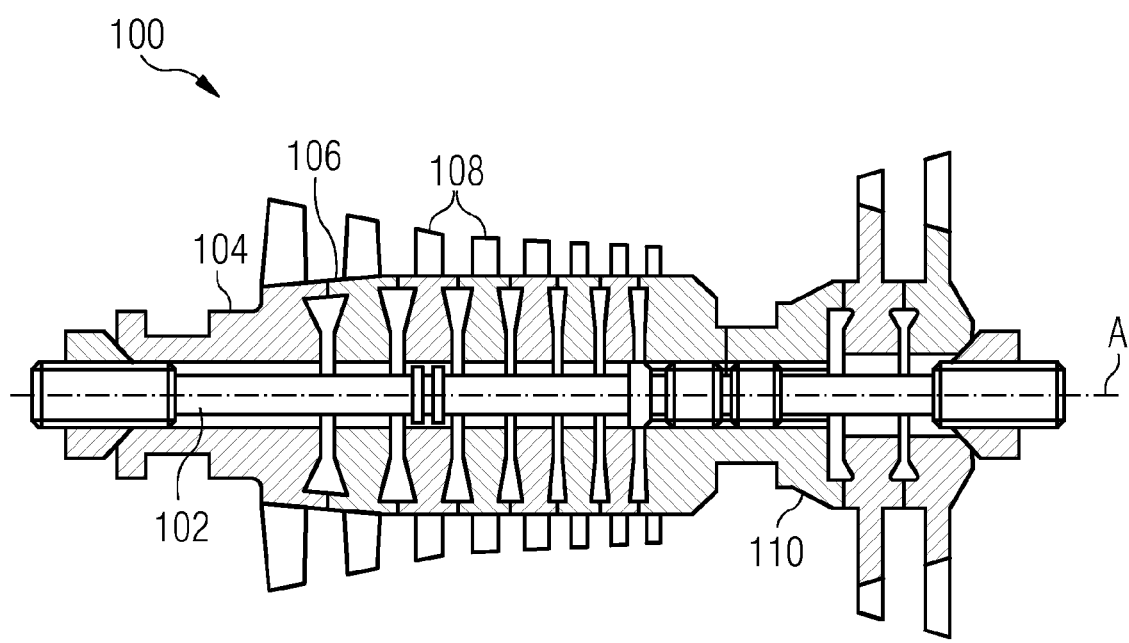
FIG. 1 shows a schematic of a gas turbine arrangement.

FIG. 1 shows an example of a rotor assembly 100 of a gas turbine engine. A tension stud or tension bolt 102 is provided in the axial centre of the rotor assembly 100, along an axis A of rotation of the rotor assembly 100. In one example, the gas turbine engine is an SGT-100, SGT-300 or an SGT-400.

In operation, the rotor assembly 100 is arranged to rotate about the axis A of rotation. All rotor parts shown in the figures may be substantially rotationally symmetric about the axis A of rotation. Stator parts are not shown in the figures and elements that interlock the rotors may not be shown in the figures.

One or more shaft elements 104, 110, such as an inlet shaft 104 and exit shaft 110, and compressor discs 106 are provided around the tension stud 102 and configured to rotate about the axis A of rotation. The shaft elements 104, 110 and the compressor discs 106 may be interlocked axially between axially adjacent rotating parts. For example, the inlet shaft 104 and the compressor discs 106 may comprise corresponding teeth that mesh together to interlock the inlet shaft element 104 and the compressor disc 106. A plurality of rotor blades 108 are held in place by the compressor discs 106. In one example, a rotor blade comprises a "t-shaped" root that is held in place between correspondingly shaped sections of the compressor discs 106. In other examples, the rotor blades 108 may extend from the compressor discs 106 themselves in the form of a blisk. As such, the tension stud 102, the inlet shaft 104, the compressor discs 106 and the rotor blades 108 may rotate together at the same speed about the axis A of the rotor. The tension stud 102 may be rotated into a threaded engagement into a threaded bore of an exit shaft 110 or alternatively be received in a retention nut (not shown), which engages with the exit shaft 110.

In one example of assembly, the exit shaft 110 may be mounted vertically in a frame and the rotor assembly 100 is constructed in a top-down vertical orientation. A series of rotor blades 108 are mounted into a groove of the exit shaft 110 and then a compressor disc 106 is slid over the tension stud 102 to hold the rotor blades 108 in place. This process is repeated to provide a series of stages of rotor blades 108 held in place between a plurality of adjacent compressor discs 106. The inlet shaft 104 is then mounted onto the tension stud 102 and receives the tension stud 102 in a bore through the inlet shaft 104. The tension stud 102 has an exposed end to allow a tool apparatus 112 for applying a load energy to the tension stud 102 to be connected.

Figure 2:
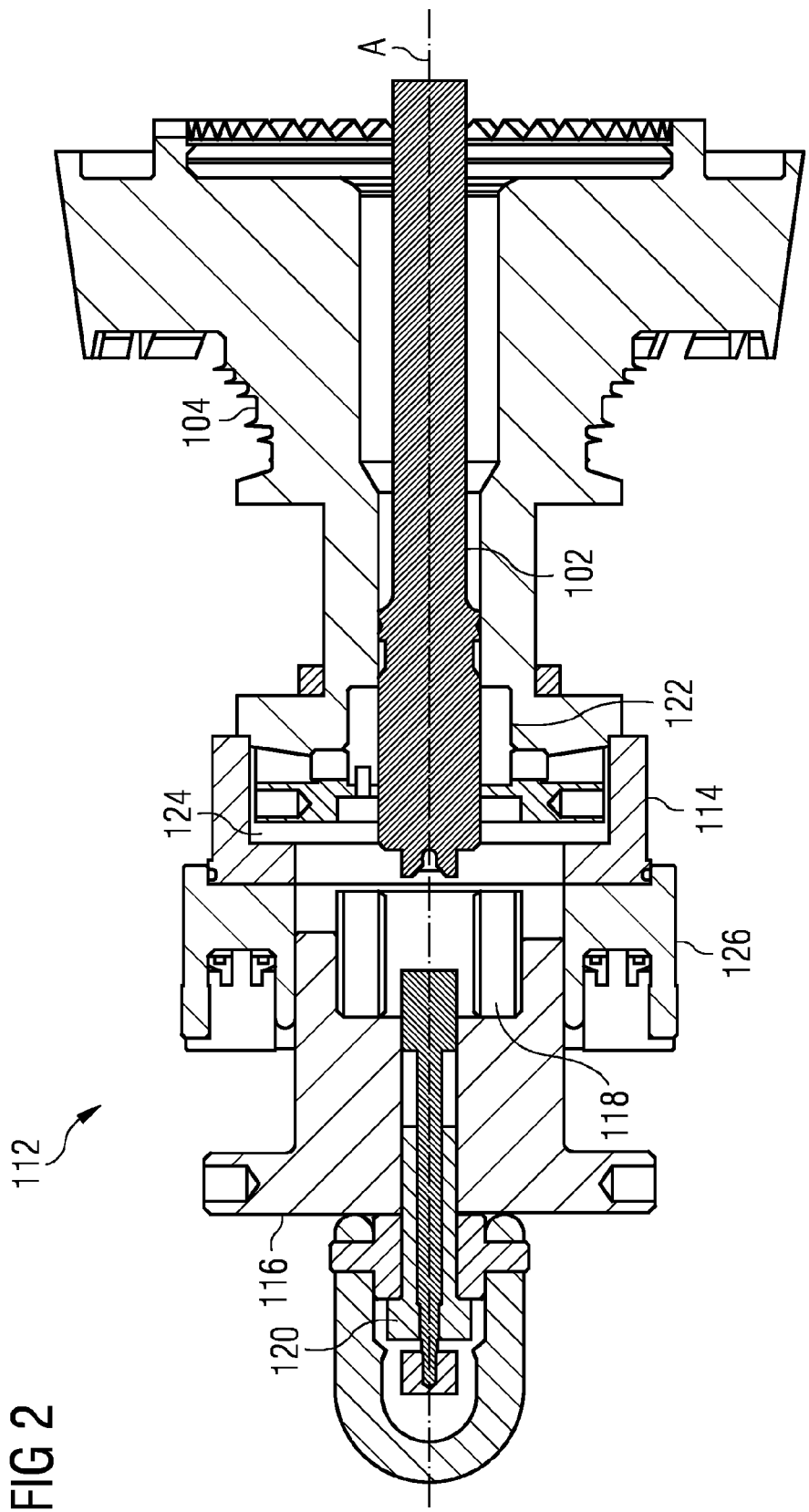
FIG. 2 shows a schematic of a tool apparatus and part of a shaft of a rotor assembly in a first position.

FIG. 2 shows a cross section of a schematic of part of the rotor assembly 100 along with a tool apparatus 112 for applying a load to the tension stud 102.

The tool apparatus 112 includes a compression body 114 configured to engage with a shaft element 104, 110 of the rotor assembly 100. In one example, the compression body 114 is configured to engage with the inlet shaft 104 of the rotor assembly 100. The compression body 114 has a profile at one end that corresponds with a shape of one end of the inlet shaft 104 to ensure a positive engagement between the compression body 114 and the inlet shaft 104. The compression body 114 may be substantially cylindrical with an axial hole therethrough such that one end of the tension stud 102 may be received in the compression body 114. The compression body 114 may have substantially cylindrical shaped walls which may include an aperture to enable access to the inside of the compression body 114.

The tool apparatus 112 includes a tool head 116 configured to connect to the tension stud 102. The tool head 116 may be substantially cylindrical and include a first region having a first diameter and a second region having a second, smaller diameter, creating a lip to enable an actuator 126 to engage with the tool head 116 and exert a load thereon. The compression body 114 is sized to receive at least part of the tool head 116 within the axial hole of the compression body 114.

In FIG. 2, the tool head 116 is disengaged from the tension stud 102. In one example, the tool head 116 includes a female threaded connection which is configured to engage with a corresponding male threaded connection on the tension stud 102.

Within the tool apparatus 112 there are critical cyclic life components that require monitoring during their repeated use, the female thread of the tool head 116 that engages with the tension stud 102 is one such component.

To minimise the cost of replacing the entire tool head 116 once the internal female thread of the tool head 116 has worn to an undesirable state, the tool head 116 may include a removable insert 118 such that the tool head 116 is connected to the tension stud 102 via the removable insert 118. In one example, the removable insert 118 includes a male thread for engaging with a co-operative female thread within the tool head 116 and a female thread for engaging with a co-operative male thread of the tension stud 102. The removable insert 118 may be economically made from higher grade material compared with the remainder of the tool head 116. Further, the removable insert 118 may be changed-out with a spare or replacement removable insert 118 whilst the original is away for inspection. This enables continued use of tool apparatus 112 whilst the original removable insert 118 is being inspected. Further, the removable insert 118 may comprise a non-shouldered outer thread, which enables its reversal. As such, the usable life of the removable insert is extended because the redundant thread is utilised.

The tool apparatus 112 includes an actuator 126 configured to apply a load to the tool head 116 and the compression body 114. In the example shown in FIG. 2, the actuator 126 is only engaged with the compression body 114. The actuator 126 may have an axial hole therethrough for receiving at least part of the tool head 116.

The tool apparatus 112 may include a measurement device 120 for measuring the stretch or elongation of the tension stud 102. The measurement device 120 will be explained in more detail below.

The rotor assembly 100 includes a load retainer 122 and a connector 124, which will be explained in more detail below.

Figure 3:
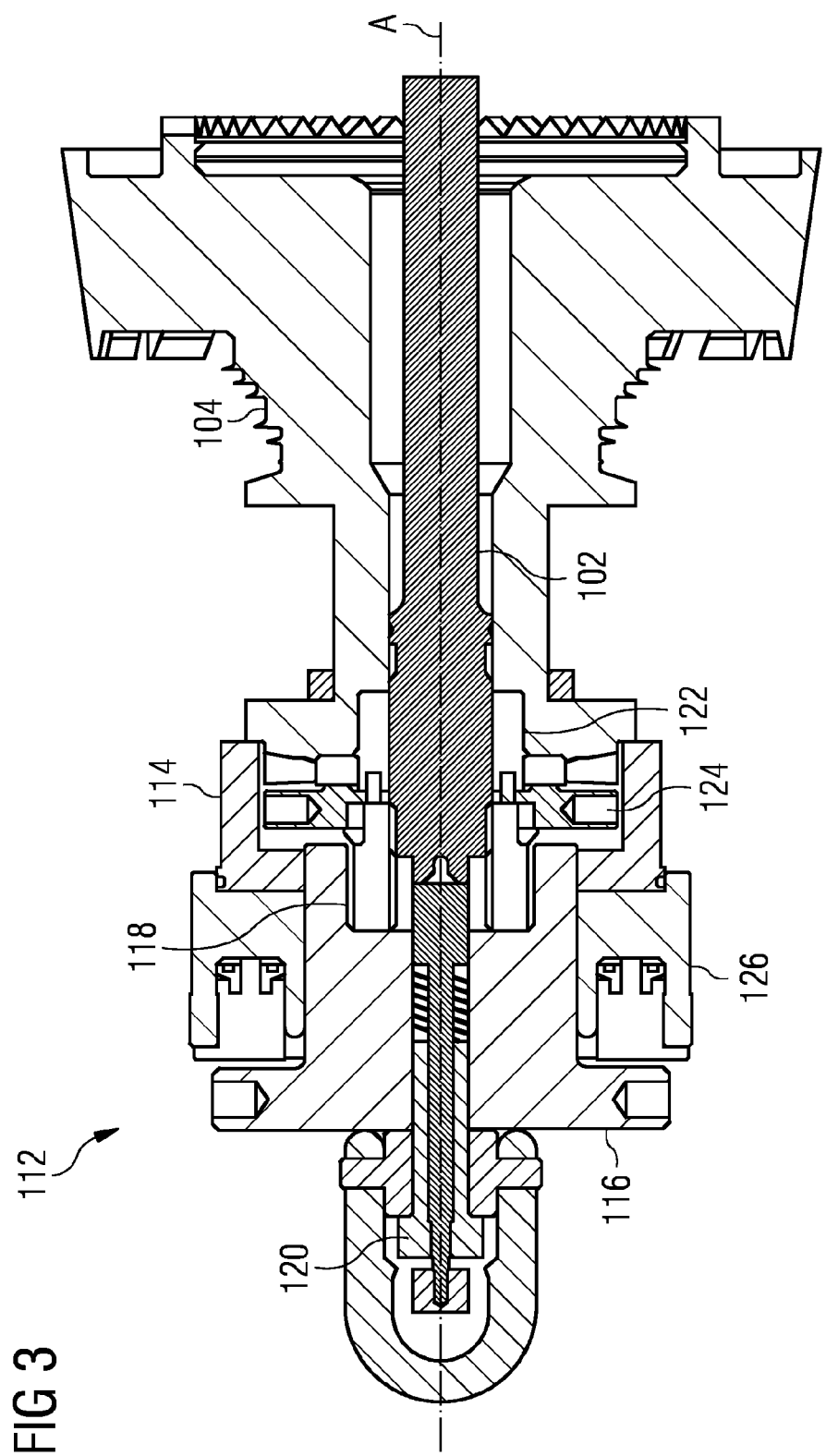
FIG. 3 shows a schematic of a tool apparatus and part of a shaft of a rotor assembly in a second position.

FIG. 3 shows a cross section of a schematic of part of the rotor assembly 100 along with the tool apparatus 112 for applying a load to the tension stud 102. In the example shown in FIG. 3, the tool head 116 is engaged with the tension stud 102 via the replaceable tool insert 118.

In the example shown in FIG. 3, the tool head 116 is received in the through hole in the compression body 114 and the removable insert 118 is engaged with the tension stud 102. In the arrangement shown in FIG. 3, the actuator 126 is engaged with both the tool head 116 and the compression body 114. In operation, the actuator 126 is configured to expand to push against the tool head 116 and the compression body 114 and exert a load on the tool head 116 and the compression body 114. As the compression body 114 is engaged with the inlet shaft 104 of the rotor assembly 100 then the load applied to the compression body 114 will be reacted by the inlet shaft 104 and the inlet shaft 104 will also be subject to compression.

In one example, the actuator 126 is a hydraulic load cell to accurately apply a pre-determined load to the tension stud 102. In other examples, the actuator 126 may be a pneumatic load cell, a torqued threaded arrangement or an electric solenoid.

Due to the connection between the tool head 116 and the tension stud 102, the load applied to the tool head 116 results in an extension of the tension stud 102 and a tension load to develop in the tension stud 102.

The load applied to the tension stud 102 is pre-determined to match the 'steady state' separation loads experienced in operation of the rotor assembly 100. In one example, to determine the tension load applied to the tension stud 102, a change in length or extension of the tension stud 102 is measured by a measurement device 120. The measurement device 120 may include a sliding plunger that projects through a bore in the tool head 116 and engages with an end of the tension stud 102. The measurement device 120 may have an exposed end that projects from the tool head 116. In one example, the measurement device 120 includes a spring to bias the plunger against the tension stud 102. The exposed end of the measurement device 120 may be fixed such that the elongation or extension of the tension stud 102 may be measured due to the corresponding reduction in length of the measurement device 120.

Due to the stress-strain relationship, a pre-determined tension load can be provided to the tension stud 102 by stretching the tension stud 102 by a predetermined amount.

Once the tension stud 102 has been extended by a pre-determined amount, corresponding to a pre-determined tension load being developed in the tension stud 102, a load retainer 122 is moved to engage with the inlet shaft 104. The load retainer 122 is moved relative to the tension stud 102 to engage with the inlet shaft 104. In one example, a connector 124, which may be in the form of a spinner, is connected with the load retainer 122 to enable an operator to move the load retainer 122 relative to the tension stud 102, without the need for an operator to have direct access to the load retainer 122. In one example, the load retainer 122 comprises a threaded nut configured to receive a corresponding thread on the tension stud 102.

In order to access the connector 124, the wall of the compression body 114 may include an aperture to enable access to the inside of the compression body 114.

Following the engagement of the load retainer 122 with the inlet shaft 104, the actuator 126 may be unloaded. During unloading, the load path between the tension stud 102 and the inlet shaft 104 is changed from passing through the compression body 114 to passing through the load retainer 122. In other words, the compression body 114 becomes unloaded as the actuator 126 is unloaded and the load retainer 122 becomes loaded as the actuator 126 is unloaded.

Once the actuator 126 has been fully unloaded, the tool apparatus 112 may be safely removed.

In operation, depending on the size of the rotor assembly 100, the rotor assembly 100 may be subject to separation loads of approximately 50 kN. In other examples, the separation loads may be more than 250 kN, more advantageously more than 500 kN, more advantageously more than 750 kN and more advantageously more than 1000 kN. To compensate against this separation load, the tension stud 102 will be subject to a matching tension load. As such, the components of the tool apparatus 112 and rotor assembly 100 will also be subject to high loads. Whilst the components are designed to withstand the loads applied to them, in practice, there are a number of reasons why failures in the components and/or connections of the rotor assembly 100 that are subject to a load may occur.

A first source of potential failure is that one or more threads between connecting elements may fail. For example, the thread between the load retainer 122 and the tension stud 102 may fail, causing the load energy within the tension stud 102 to be released.

Alternatively, the threads between the removable insert 118 and either the corresponding thread of the tool head 116 or the corresponding thread of the tension stud 102 may fail during loading of the tension stud 102, which causes the load from the actuator 126 to be unrestrained at one end.

In another example, there may be a lack of engagement between the compression body 114 and the inlet shaft 104 or the actuator 126 and the tool head 116 or the compression body 114.

Further, the load applied by the actuator 126 may be too high, resulting in a failure of one or more component and/or connection between components.

In each of these examples, a release of energy occurs, which may cause injury to a nearby operator or damage to nearby equipment.

Figure 4:
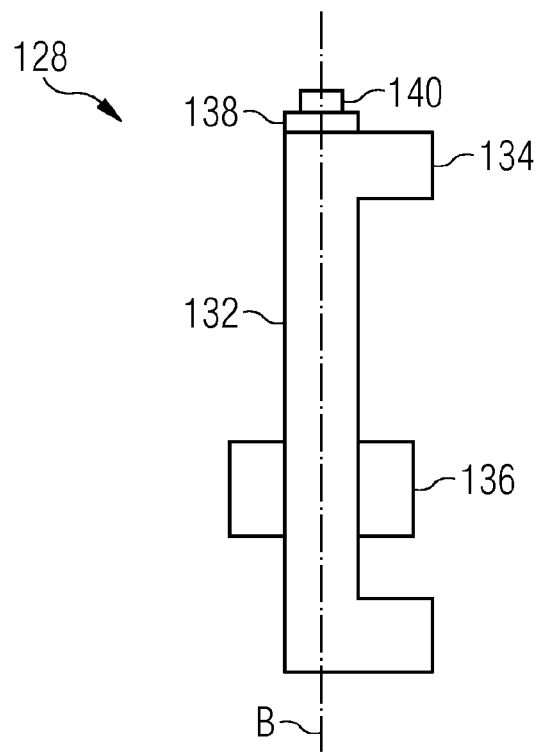
FIG. 4 shows a side view of a safety apparatus in first orientation.

FIG. 4 shows as example of a safety apparatus 128 or catcher arm for use with the tool apparatus 112. The safety apparatus 128 and the tool apparatus 112 form a tool assembly 130 for safely applying a tension load to the tension stud 102 with a reduced risk of energy release outside of the tool assembly 130 as the safety apparatus 128 is configured to contain the load energy released from the tension stud 102 due to a failure.

The safety apparatus 128 has an elongate member 132 that defines a longitudinal axis B. In one example, the elongate member 132 is substantially cylindrical. The safety apparatus 128 has at least two arms 134 or catches that project from the longitudinal axis B of the elongate member 132. In one example, the elongate member 132 and arms 134 are part of the same component, i.e. integral, but in other examples, they may be distinct components that are joined together. In one example, one arm 134 of the safety apparatus 128 is located towards a first end of elongate member 132 and a second arm 134 is located towards a second end of the elongate member 132.

The elongate member 132 and the arms 134 are sized such that they can withstand the various loads resulting from a release of energy due to a failure of one or more components of the tool apparatus 112 and/or rotor assembly 100 whilst the load is applied to the tension stud 102 or after the load has been applied to the tension stud 102.

In one example, the material of the safety apparatus 128 is a nickel chromium molybdenum steel, which is advantageously due to its high tensile strength and toughness.

In order to retain the loads that may be applied to the safety apparatus 128 as a result of an energy release, the elongate member 132 and arms 134 of the safety apparatus 128 are sized so as to withstand the loads that may be released as a result of a failure of one or more components. In one example, the elongate member 132 has a length of approximately 300 mm to 600 mm and a cross-sectional area of approximately 3200 mm$^2$ to 5000 mm$^2$. Further, the arms 134 of the safety apparatus will be subject to high shear loads during an energy released and have a cross sectional area of approximately 2400 mm$^2$ to 3200 mm$^2$.

The safety apparatus 128 may also include a fixture 136 for connecting the safety apparatus 128 to the tool apparatus 112. In one example, the fixture 136 includes a housing for receiving the elongate member 132 and a bolt arrangement for connecting the fixture 136 to the compression body 114 of the tool apparatus 112. The housing may have an internal cavity that substantially matches the outer profile of the elongate member 132 that allows the safety apparatus 128 to move relative to the housing, for example, allows the safety apparatus 128 to rotate about the axis B.

Figure 5:
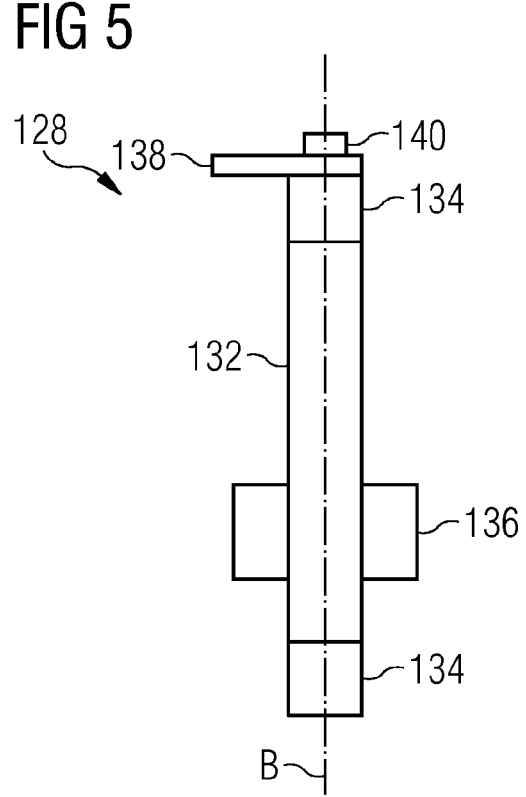
FIG. 5 shows a side view of a safety apparatus in second orientation.

FIG. 5 shows another view of the safety apparatus 128. In the example shown in FIG. 5, a lifting member 138 is shown projecting away from the axis B. The lifting member 138 may comprise a plate and is fixed relative to the arm 134 and elongate member 132 via a connector 140, such as a bolt.

The examples in FIGS. 4 and 5 show the lifting member 138 projecting away from the axis B in a first direction and the arms 134 projecting away from the axis B in a second direction, different to the first direction.

Figure 6:
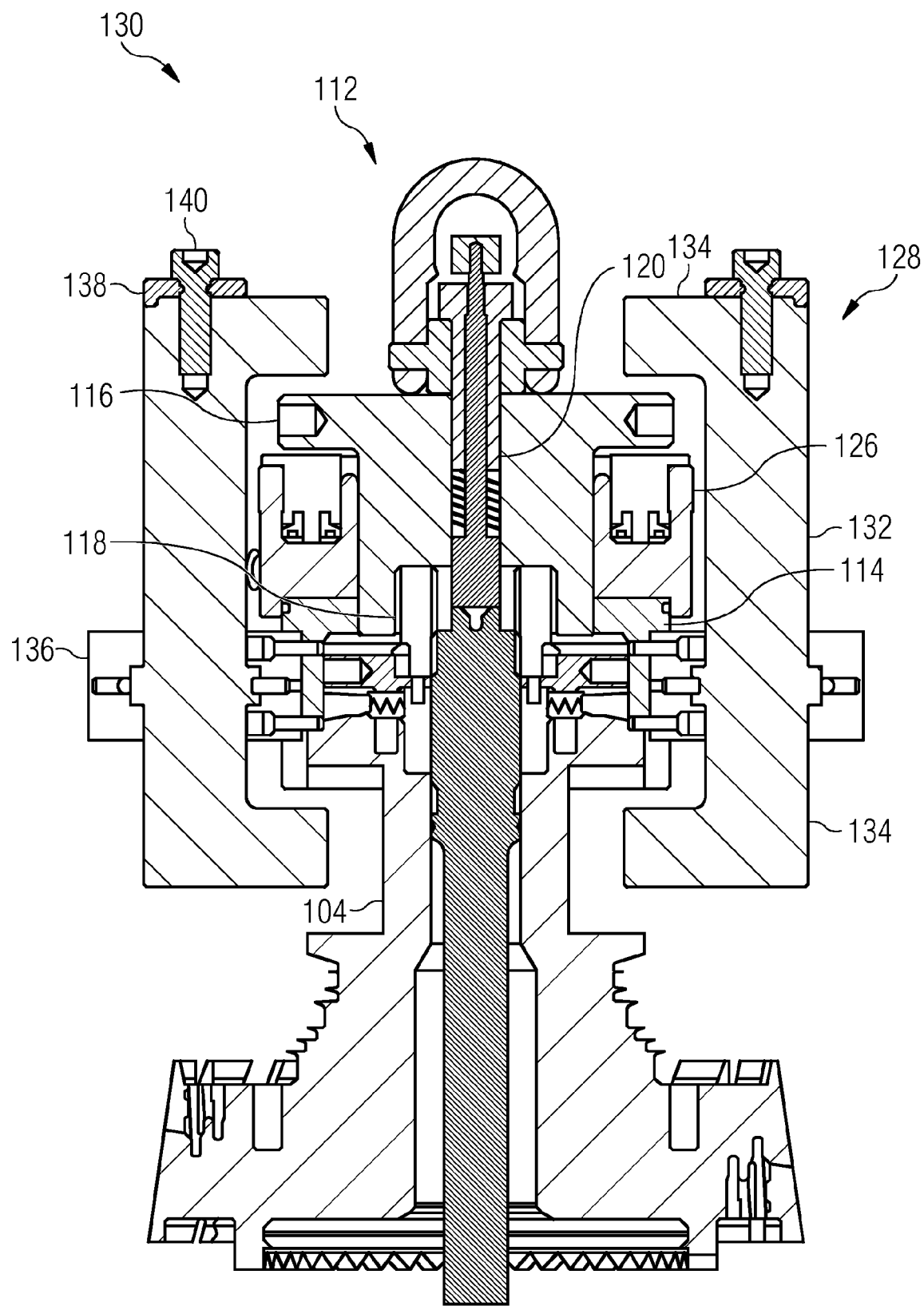
FIG. 6 shows a schematic of a tooling assembly in which the safety apparatus are in first orientation.

FIG. 6 shows an example of a tool assembly 130 comprising a safety apparatus 128 and a tool apparatus 112. As shown in FIG. 6, the safety apparatus 128 may be configured to connect to the tool apparatus 112. In one example, the safety apparatus 128 may connect to the compression body 114 of the tool apparatus via the fixture 136.

In FIG. 6, the safety apparatus 128 is shown in a first orientation in which the arms 134 project from the longitudinal axis of the elongate member 132 such that the arms 134 overlap with at least part of the tool apparatus 112 in the direction of the longitudinal axis of the elongate member 132. In this example, the longitudinal axis B of the elongate member 132 is parallel with the direction of the rotational axis A of the rotor assembly 100. As such, in this example, in the first orientation, the arms 134 overlap with at least part of the tool apparatus 112 in the direction of the rotational axis of the rotor assembly 100. Put another way, in the first orientation of the safety apparatus 128, the arms 134 are arranged such that at least part of the tool apparatus 112 is located between the arms 134 and the tool apparatus 112 could not be removed due to the presence of the safety apparatus 128. As the load is applied to the tension stud 102 by the tool apparatus 112, then in the event of a failure of one or more of the components or connections of the assembly, then the tool apparatus 112 may quickly move away from the rotor assembly 100. In the first orientation, the arms 134 will catch the tool apparatus 112 and contain the load within the safety apparatus 128. In one example, the tool head 116 will be caught by the arms 134 as a result of the energy release. As such, the safety apparatus 128 acts as redundancy safety mechanism, such that even in the event of a failure of one or more of the components or connections of the tool apparatus 112 or the rotor assembly 100, then the risk of injury to a user or damage to the surrounding equipment or environment is significantly reduced because the energy released by the failure will be contained within the safety apparatus 128. In one example, the mass of the tool apparatus is between 80 kg to 180 kg and the distance travelled by the tool apparatus before hitting safety apparatus 128 is between 5 mm to 20 mm. The speed in which the tool apparatus hits the safety apparatus is between 7 m/s and 21 m/s. Further the energy released may be between approximately 1500 J to 4000 J and so the safety apparatus 128 is designed to withstand and contain this release of energy.

Where possible all components of the tool apparatus 112 are designed to meet mechanical strength requirements for a given cyclic life with acceptable safe working margins. At a given time during assembly, operators must access the tool assembly 130 (i.e. measuring stretch and dismantling tooling). During this time, it is especially essential to provide a second-tier of safety to "fool-proof" against failure scenarios such as accidental over pressure of the actuator and/or damaged or worn threads. This is achieved by the addition of the safety apparatus 128 to the tool apparatus 112. In the event of a component failure, the safety apparatus 128 are capable of containing the energy released from the tension stud 102 and/or one of the other components subject to loading.

Figure 7:
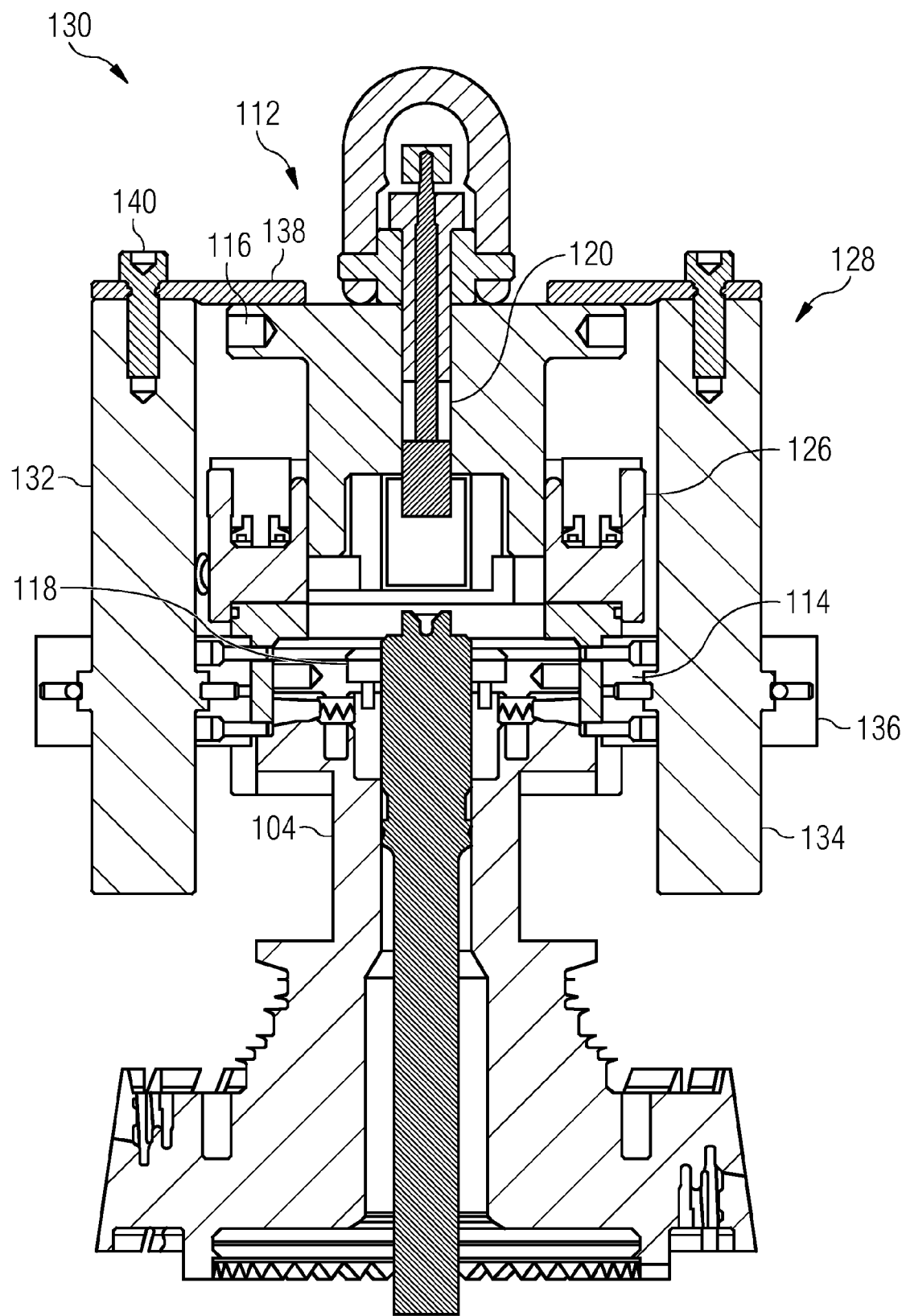
FIG. 7 shows a schematic of a tooling assembly in which the safety apparatus are in second orientation.

FIG. 7 shows an example of the safety apparatus 128 in a second orientation. During application of loads to the tension stud 102, it is necessary to be able to lift the tool assembly 130 to and from the rotor assembly 100. In this second orientation the arms 134 are clear of the tool apparatus 112 in the direction of the longitudinal axis B of the elongate member 132. In other words, the arms 134 do not overlap with the tool apparatus 112 in the direction of the longitudinal axis B of the elongate member 132. In the example shown in FIG. 7, the safety apparatus 128 includes a lifting member 138. As the tool apparatus 112 is lifted, the tool head 116 will move to engage with the lifting member 138 of the safety apparatus 128. In one example, the tool head 116 includes a lifting handle to enable the tool head 116 to be lifted. As the safety apparatus 128 is fixed relative to the tool apparatus 112 in the linear direction of the axis B by fixture 136 (but not rotationally about the axis B), then as the tool apparatus 112 is lifted, the tool assembly 130 may be lifted as one piece from the inlet shaft 104. The ability to move these components together significantly reduces the complexity and cost of the assembly operation as previously these separate components would need to be transported separately.

The lifting member 138 may perform the dual functions of enabling the tool assembly 130 to be lifted as one piece, whilst also operating as a handle to enable a user to rotate the safety apparatus 128 between the first orientation, in which the arms 134 are in the containment position, and the second orientation in which the arms 134 are clear of the tool apparatus and the lifting members 138 are in the lifting position.

In one example, the safety apparatus 128 is rotatable throughout approximately 90 degrees between the first orientation and the second orientation about the longitudinal axis B of the elongate member 132. The range of movement of the safety apparatus 128 may be limited by an indent screw located in the fixture 136 that is received in a slat of the safety apparatus 128. In one example, the indent screw (not shown) limits the rotation of the safety apparatus 128 to approximately 90 degrees.

Referring to FIGS. 6 and 7, the tooling assembly 130 includes at least one safety apparatus 128 connected to the tool apparatus 112. In one example, the at least one safety apparatus 128 is connected to the compression body 114 of the tool apparatus 112. In the examples shown in FIGS. 6 and 7, two safety apparatus 128 are connected to the tool apparatus 112, however, in other examples, more safety apparatus 128 may be used. In other examples, only a single safety apparatus 128 is connected to the tool apparatus 112. Using two safety apparatus 128 aims to balance the forces received in each safety apparatus 128 during a failure event. The two safety apparatus 128 may be diametrically opposed about the tool apparatus 112 such that reduced bending moments develop in the arms 134 of the safety apparatus 128 during a failure event. The tooling assembly 130 is configured to apply a load to the tension stud 102 of the rotor assembly 100 in a safe manner.

In one example, a resilient material, such as rubber, is provided between the arms 134 of the safety apparatus 128 of the tool assembly 130 and the components of the tool apparatus 112 and/or rotor assembly 100. For example, resilient material may be provided between the arm 134 and the tool head 116 and also between the arm 134 and the inlet shaft 104.

FIG. 8 shows an illustration of a method of applying a load to a tension stud 102 of a rotor assembly 100. In step 200, the compression body 114 is engaged with a shaft of the rotor assembly. In one example, the shaft comprises an inlet shaft 104.

In step 202, the tool head 116 of the tool apparatus 112 is connected to the tension stud 102. In one example, the tool head 116 includes a removable insert 118 comprising a hollow cylinder in which both the outside face and the inside face of the hollow cylinder are threaded. The thread on the outer face of the removable insert 118 may connect with a corresponding thread of a cavity within the tool head 116 for receiving the removable insert 118. The thread on the internal face of the removable insert 118 may connect with a corresponding thread on the tension stud 102.

In step 204, the actuator 126 is provided between the tool head 116 and the compression body 114.

In step 206, the safety apparatus 128 is positioned in a first orientation in which at least part of the tool head 116 is located between the at least two arms 134 of the safety apparatus 128.

In step 208, the actuator is actuated to apply a load to the tool head 116 and the compression body 114 to provide a tension load in the tension stud 102.

In a further step, the method may include measuring the elongation of the tension stud 102 via measurement device 120. The method may further include determining that the tension stud 102 has elongated by a predetermined amount and rotating the load retainer 122 which is co-operatively threaded to the tension stud 102. The load retainer 122 is moved so that it engages with the shaft 104 of the rotor assembly 100.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A safety apparatus for containing a release of energy from a tension stud of a rotor assembly, the safety apparatus comprising:
   an elongate member defining a longitudinal axis; and
   at least two arms projecting away from the longitudinal axis of the elongate member,
   wherein in use, in a first orientation, the elongate member is configured to be connected to a tool apparatus for applying a load energy to the tension stud and the at least two arms of the safety apparatus are configured to overlap with at least part of the tool apparatus in the direction of the longitudinal axis of the elongate member to contain the release of energy therebetween.

2. The safety apparatus according to claim 1,
   wherein the safety apparatus is movable between the first orientation and a second orientation in which the at least two arms of the safety apparatus are clear of the tool apparatus in the direction of the longitudinal axis of the elongate member.

3. The safety apparatus according to claim 2, further comprising:
   a lifting member projecting away from the longitudinal axis of the elongate member in a first direction and the at least two arms project away from the longitudinal axis of the elongate member in a second direction, wherein the second direction is different to the first direction,
   wherein, in use, the lifting member is movable to move the safety apparatus between the first orientation and the second orientation.

4. The safety apparatus according to claim 2,
   wherein the safety apparatus is rotatable throughout approximately 90 degrees between the first orientation and the second orientation.

5. A tool assembly for applying a load to a tension stud of a rotor assembly, the tool assembly comprising:
   at least one safety apparatus according to claim 1; and
   a tool apparatus comprising:
      a tool head for connecting to the tension stud;
      a compression body for engaging with a shaft of the rotor assembly; and
      an actuator for applying a load to the tool head and compression body,
   wherein the at least one safety apparatus is connected to the tool assembly, wherein in the first orientation, at least part of the tool head is located between the at least two arms of the safety apparatus.

6. The tool assembly according to claim 5,
   wherein the tool assembly comprises two diametrically opposed safety apparatus connected to the tool apparatus.

7. The tool assembly according to claim 5,
   wherein the tool head comprises a removable insert, the removable insert comprising:
   a male thread for engaging with a co-operative female thread within the tool head; and
   a female thread for engaging with a co-operative male thread of the tension stud.

8. The tool assembly according to claim 5,
   wherein the compression body comprises a substantially cylindrical sidewall comprising an aperture.

9. The tool assembly according to claim 5, further comprising:
   a measurement apparatus configured to measure the extension of the tension stud.

10. The tool assembly according to claim 9,
    wherein the measurement apparatus comprises a plunger configured to extend through the tool head and engage with the tension stud.

11. The tool assembly according to claim 5,
    wherein the actuator comprises a hydraulic load cell.

12. The tool assembly according to claim 5,
    wherein the safety apparatus is movable between the first orientation and a second orientation in which the at least two arms of the safety apparatus are clear of the tool apparatus in the direction of the longitudinal axis of the elongate member;
    the safety apparatus further comprising a lifting member projecting away from the longitudinal axis of the elongate member in a first direction and the at least two arms project away from the longitudinal axis of the elongate member in a second direction, wherein the second direction is different to the first direction;
    wherein, in use, the lifting member is movable to move the safety apparatus between the first orientation and the second orientation;
    wherein the tool apparatus is moveable relative to the safety apparatus in the second orientation such that the tool head is engageable with the lifting member to enable the tool assembly to be lifted as a single piece.

13. A method of applying a load to a tension stud of a rotor assembly, the method comprising:
    engaging a compression body with a shaft of the rotor assembly;
    connecting a tool head to the tension stud;
    providing an actuator between the tool head and the compression body;
    positioning the safety apparatus of claim 1 in a first orientation in which at least part of the tool head is located between the at least two arms of the safety apparatus; and
    actuating the actuator to apply a load to the tool head and the compression body to provide a tension load in the tension stud.

14. The method according to claim 13, further comprising measuring the elongation of the tension stud via measurement apparatus.

15. The method according to claim 14, further comprising:
    determining that the tension stud has elongated by a predetermined amount; and
    rotating a connector connected to a load retainer which is co-operatively threaded to the tension stud, wherein the load retainer is moved so that it engages with the shaft of the rotor assembly.

* * * * *